W. R. SCOTT.
LACE MACHINE CARRIAGE THREADING MECHANISM.
APPLICATION FILED MAY 4, 1916.

1,346,790.

Patented July 13, 1920.
6 SHEETS—SHEET 5.

Inventor:
Walter R. Scott,
By Arthur E. Paige,
Attorney

W. R. SCOTT.
LACE MACHINE CARRIAGE THREADING MECHANISM.
APPLICATION FILED MAY 4, 1916.

1,346,790.

Patented July 13, 1920.
6 SHEETS—SHEET 6.

Inventor:
Walter R. Scott,
By
Attorney

UNITED STATES PATENT OFFICE.

WALTER R. SCOTT, OF PHILADELPHIA, PENNSYLVANIA.

LACE-MACHINE-CARRIAGE-THREADING MECHANISM.

1,346,790. Specification of Letters Patent. Patented July 13, 1920.

Application filed May 4, 1916. Serial No. 95,508.

*To all whom it may concern:*

Be it known that I, WALTER R. SCOTT, a citizen of the United States, residing at Philadelphia, in the State of Pennsylvania, have invented a certain new and useful Improvement in Lace - Machine - Carriage-Threading Mechanism, whereof the following is a specification, reference being had to the accompanying drawings.

My invention is designed and adapted for use in connection with the shuttles, called bobbin carriages, of the type employed in what are known as Jardine lace machines, to receive the carriages containing bobbins from which the thread has been withdrawn, discharge the empty bobbins, and then charge such carriages with bobbins filled with thread, insert the free ends of the respective threads through the guide openings of said carriages, in operative position, and deliver the carriages thus threaded in stacks of fifty; the two operations of threading and unthreading being effected simultaneously, upon different carriages, by coöperation of the various elements of said mechanism. However, it is to be understood that I do not desire to restrict my invention to the specific type of shuttles aforesaid.

My invention includes the various novel features of construction and arrangement hereinafter more definitely specified In the drawings.

In said figures; 1 is a base plate having the standards 2, 3 and 4 in which the main driving shaft 5 is journaled. Said shaft has the hand wheel 6, (by which the machine may be manually operated) but is arranged to be driven by the pulley 7 having the belt 8 and adapted to be connected and disconnected with respect to said shaft 5 by the clutch 10 which may be manually shifted by the lever 11 which is fulcrumed at 12 on said base plate 1 and has its upper end pivotally connected at 13 with the slide rod 14 having handles 15 at its opposite ends.

Figure 1:
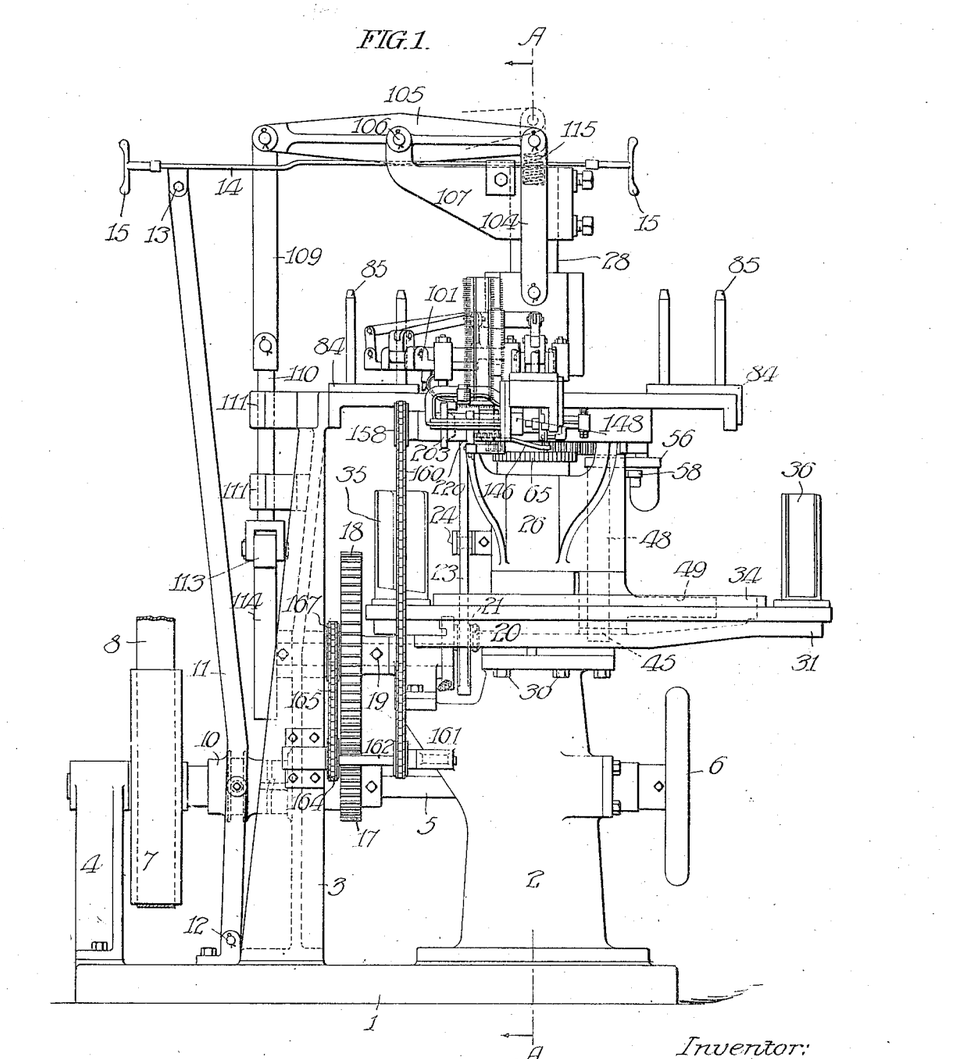
Figure 1 is a front elevation of a machine conveniently embodying my invention.
Figure 2:
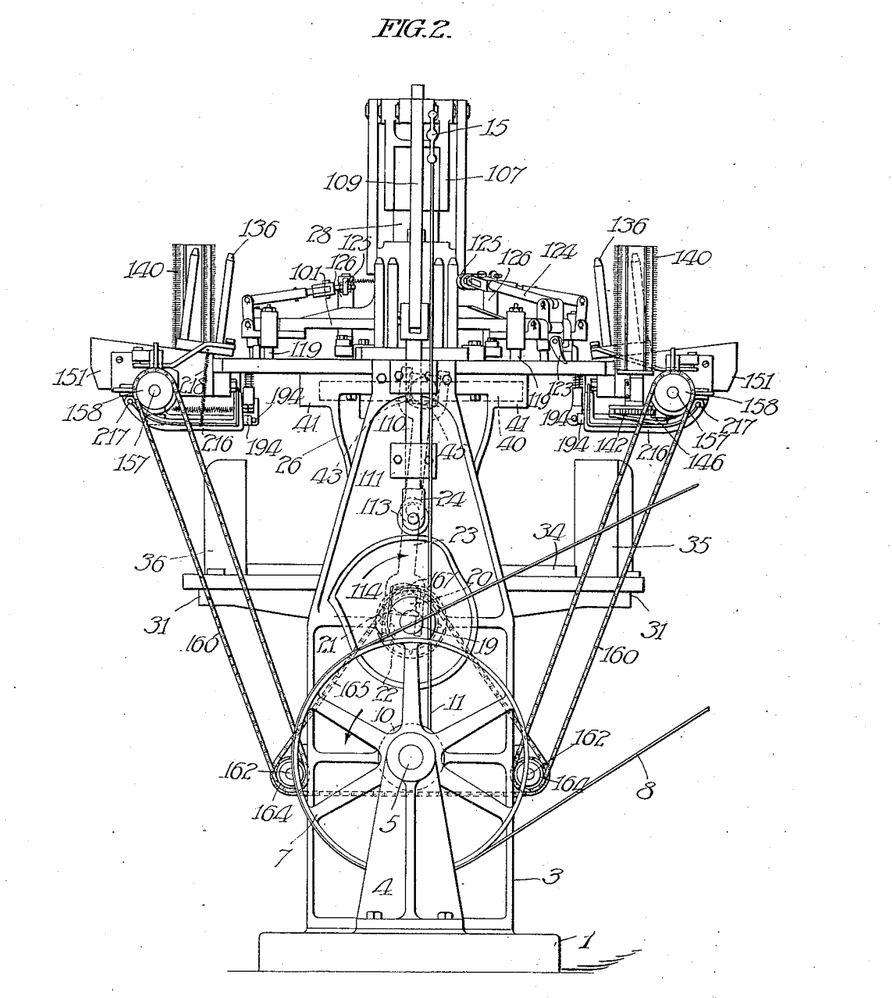
Fig. 2 is an elevation of the left hand end of said machine, as shown in Fig. 1.
Figure 3:
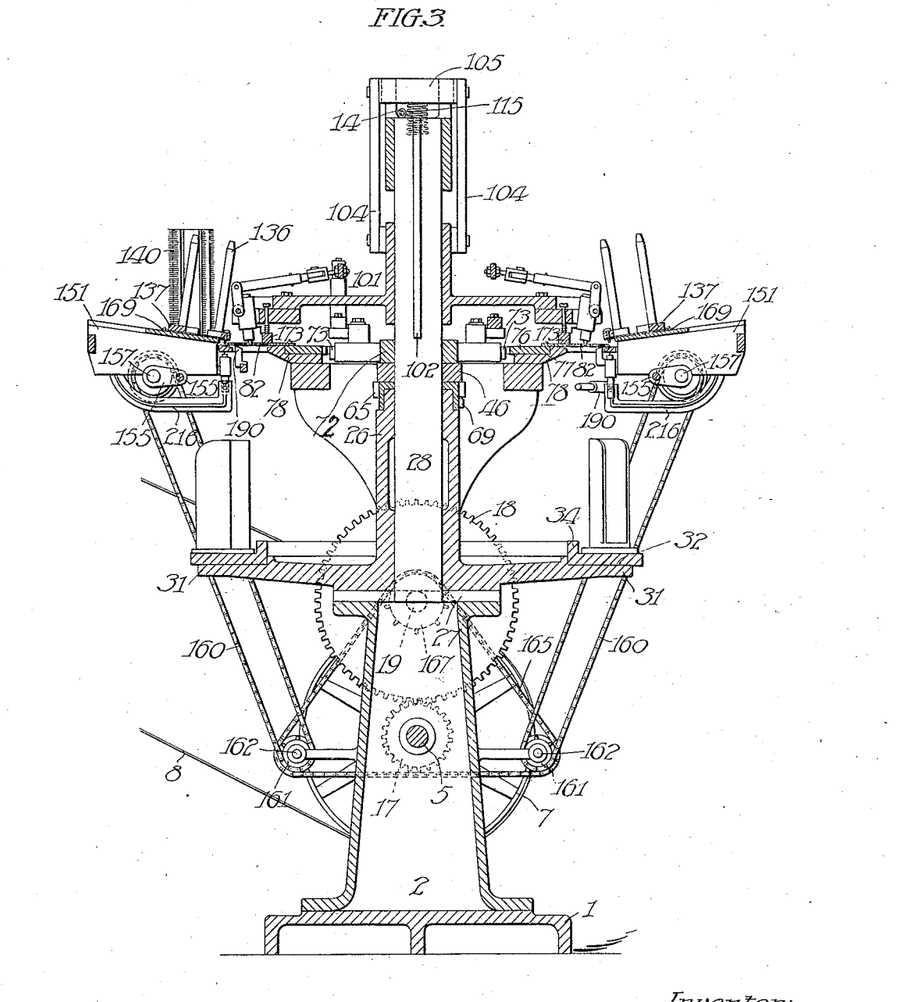
Fig. 3 is a vertical sectional view of said machine, taken on the line A, A, and in the direction of the arrows indicated in Fig. 1.
Figures 4, 5, 6:
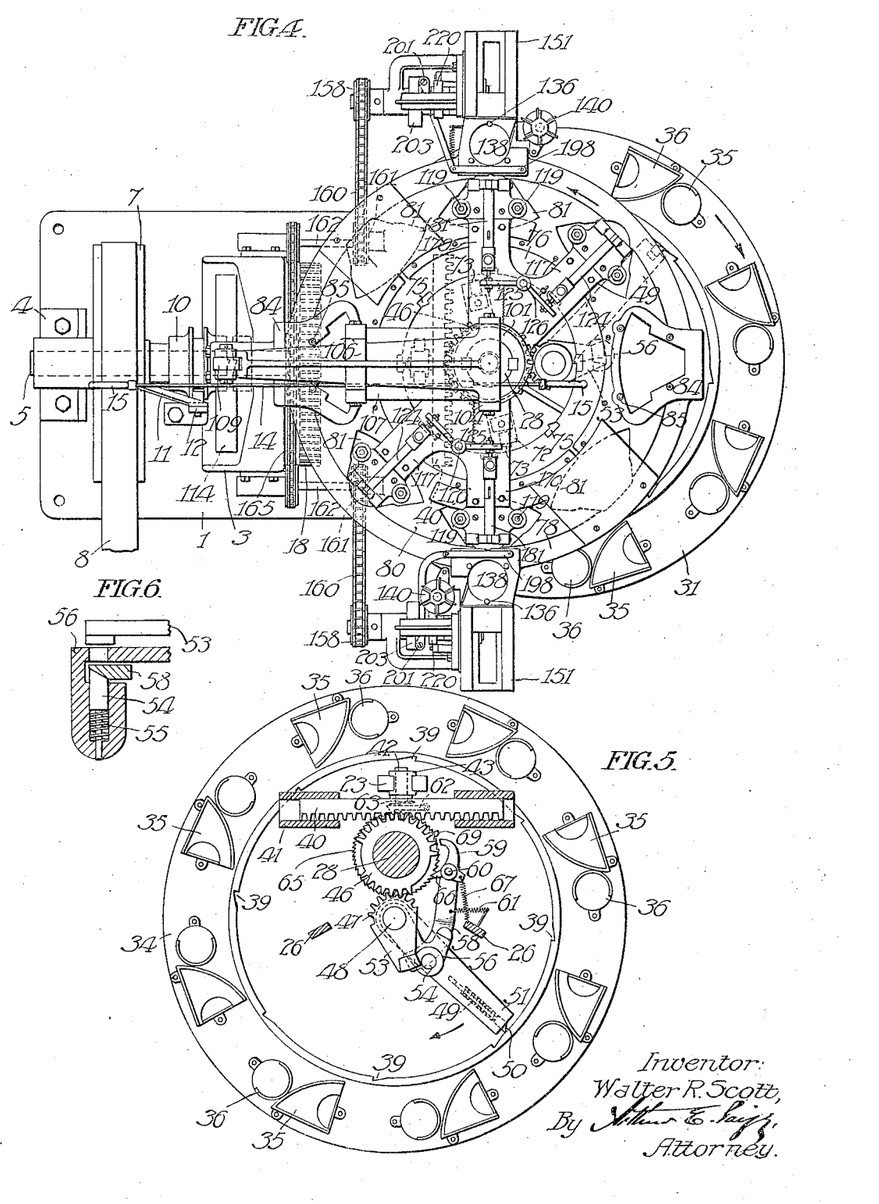
Fig. 4 is a plan view of said machine.
Fig. 5 is a plan sectional view showing the lower rotary carrier provided with the holders into which stacks of carriages and bobbins are automatically discharged by the operation of said machine, showing the mechanism whereby said carrier is shifted step by step, in such coöperative relation with the other mechanism that each of said holders is successively presented in position to receive fifty of the carriages or bobbins which it is adapted to hold and is then withdrawn and another holder presented in receiving position.
Fig. 6 is a fragmentary sectional view showing the means for locking said carrier shifting mechanism in idle position and releasing said locking means.

Said shaft 5 has rigidly mounted thereon the gear pinion 17 engaged with the gear 18 on the crank shaft 19 which is journaled in said standards 2 and 3, as best shown in Fig. 1, and has at its inner end the crank 20 extending through the box 21 which is fitted to slide in the slot 22 in the lever 23, as indicated in Figs. 1, 2 and 5. Said lever 23 is fulcrumed on the stud 24 which is rigidly connected with the stationary sleeve 26 which is rigidly connected with said standard 2 as best shown in Figs. 1 and 3. Said standard 2 is slotted at the top thereof to receive the cross bar 27 which supports the column 28 which is also slotted to fit said cross bar 27, so as to be held in rigid relation with said standard 2. Said sleeve 26 is fitted upon said column 28, as shown in Fig. 3, and is rigidly connected with said standard 2 by the bolts 30 shown in Fig. 1. Said sleeve 26, has, at its lower portion, the circular flange 31 which is, however, eccentric with respect to said column 28, as best shown in Fig. 5. Said flange 31 includes an annular track 32 for the lower rotary carrier 34 (best shown in Fig. 5,) provided with the holders 35 and 36 respectively for the stacks of carriages 82 and bobbins 86 which are automatically discharged therein by the operation of said machine. I find it convenient to provide said rotary carrier 34 with eight of each of the holders 35 and 36, respectively adapted to hold stacks of fifty carriages and bobbins, and provide the inner circumference of said carrier with a series of eight notches 39 whereby it may be shifted step by step, one-eighth of a revolution at a time, as said holders are filled; the movement of said carrier being effected in proper sequence with the other movements of the machine after fifty discharging operations of the latter; such movement being conveniently effected by the mechanism shown in Fig. 5 and including the gear rack 40 which is mounted to reciprocate horizontally in the stationary bearings 41, on said sleeve 26, and is reciprocated, once for each of said discharging operations, by engagement of its stud 42 in the box 43 which slides in the slot 45 in the upper end of said lever 23. Said rack 40 engages the sectoral gear 46, which turns loosely on said column 28, and said gear 46 engages the sectoral gear 47 which turns loosely on the shaft 48 (indicated in Figs. 1 and 5) which is journaled in said stationary frame sleeve 26. Said shaft 48 has, rigidly connected therewith, the arm 49, best shown in Fig. 5, which carries at its outer end the pawl plunger 50 having the spring 51 tending to press it into engagement with the notches 39 in said carrier 34, whereby the latter may be shifted one-eighth of a revolution each time said normally loose gear 47 is operatively connected with said shaft 48 on which it normally oscillates idly. Such operative connection is effected by the arm 53 on said gear 47 which extends radially with respect to said shaft 48, in position to encounter the locking plunger 54 (shown in Figs. 5 and 6) when said plunger is raised by its spring 55 into engagement with said arm 53. Said plunger 54 is carried by the arm 56 which is rigidly connected with said shaft 48. However, said plunger 54 is normally held down, in the idle position shown in Fig. 6, by the lever 58 which has the arm 59 by which it may be operated to release said plunger, as hereinafter described, and is fulcrumed on the stud 60, carried by said stationary frame sleeve 26, and is normally held in the position shown in Fig. 5 by the spring 61 connecting said lever with said stationary frame member 26. The end of said lever 58 which is operative upon said plunger 54 extends in concentric relation with said shaft 48 so that said arm 56 may slide freely with respect to said lever 58 without movement of the latter.

Said rack 40 carries the pawl 62 having the spring 63 normally pressing it into engagement with the ratchet wheel 65 which also turns loosely on said stationary col-column 28. Said ratchet 65 has fifty teeth which are successively engaged by said pawl 62, and is turned to the extent of one tooth at each reciprocation of said rack 40; reverse movement of said ratchet being prevented by the detent pawl 66 (shown in Fig. 5) which is pivoted on said stationary stud 60, and pressed into engagement with said ratchet by the spring 67 extending from said pawl 66 in connection with said stationary frame member 26. Said rack 40 is reciprocated once for each operation of the machine by which carriages and bobbins are simultaneously discharged into the respective holders 35 and 36, and the purpose of said ratchet 65, and its appurtenances, is to render the movement of said rack 40 effective to shift said carrier 34 one-eighth of a revolution, after every fifty discharging operations, and thus remove from receiving position the holders 35 and 36 which have been filled with respective stacks of fifty of said carriages and bobbins, and successively present empty holders 35 and 36 in receiving position. For that purpose, said ratchet wheel 65 also carries the cam projection 69 (shown in Fig. 5) adapted to encounter said arm 59 of said lever 58, and move the latter to release said locking plunger 54; thus permitting the latter to rise and couple said gear 47 with said arm 56 to turn said shaft 48 and thus turn said arm 49 to engage one of said eight notches 39 in said carrier 34 and thus turn the latter one-eighth of a revolution. The next reciprocation of said rack 40, turning said ratchet one tooth, turns said cam 69 out of engagement with said lever arm 59 and said lever 58 being thus released is automatically returned to the position shown in Figs. 5 and 6; by its spring 61.

Figure 7:
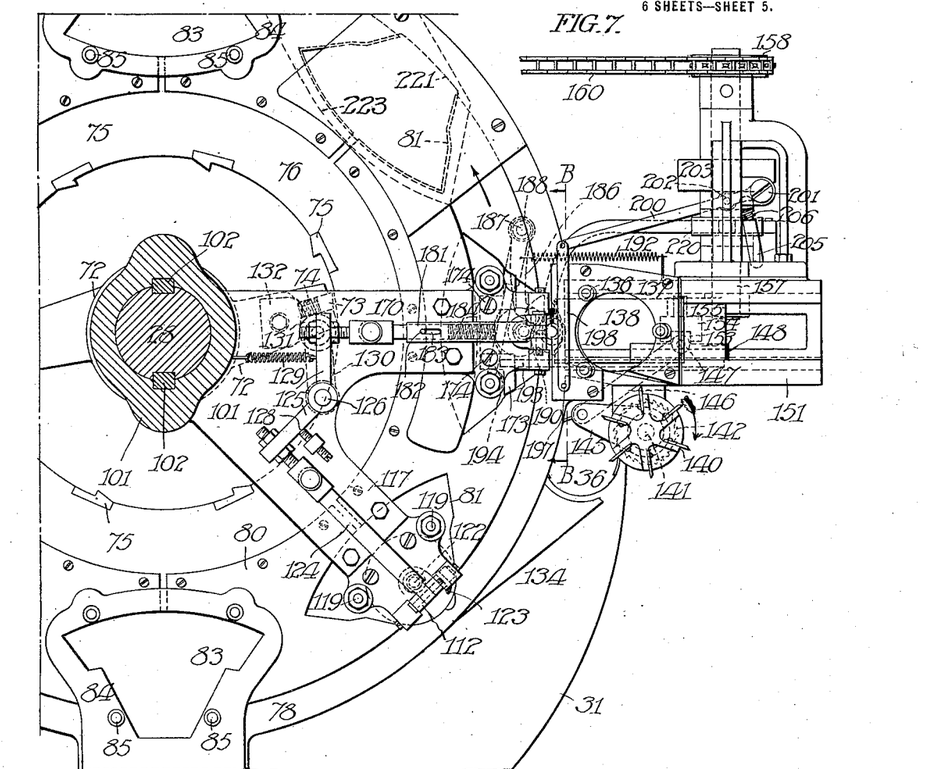
Fig. 7 is a fragmentary plan view of the upper portion of Fig. 4, but on a larger scale.

Said gear 46, which is oscillated, loosely, on said column 28, once for each discharging operation above contemplated, carries the yoke 72 which, as indicated in Figs. 3, 4 and 7 is arranged to turn loosely on said stationary column 28 and has diametrically opposite arms, each carrying at its outer end a pawl plunger 73 having a spring 74 tending to press it into engagement with the eight ratchet teeth 75 on the rotary carrier 76 (best shown in Fig. 7) which is mounted to turn on the track 77 in the stationary frame table 78 which is rigidly connected with the anular upper portion of said sleeve 26. Said carrier 76 has a plane horizontal flange 80 extending circumferentially therefrom and conveniently formed of sectors of sheet metal having a circumferential series of openings 81 each adapted to receive one of the carriages 82; said flange 80 being but slightly thicker than said carriages. Said carrier 76 stops with respective openings 81 therein in registry with openings 83 in diametrically opposite base plates 84 (shown in Figs. 4 and 7) which are rigidly connected with and supported by said table 78, and, with the guide studs 85 projecting upwardly therefrom form holders through which stacks of said carriages 82, containing empty bobbins 86 are introduced to the machine. The bobbin carriages in the respectively opposite stacks automatically gravitate into the openings 81 in said flange 80 of the rotary carrier whenever said openings are presented in registry with said holder openings 83; so that with each step by step turning movement of said carrier 76, two of said carriages are withdrawn from the bottom of the stacks (one from each stack,) and swept along by said flange 80; said carriages resting and sliding upon the plane top of said table 78.

Figures 12, 13:
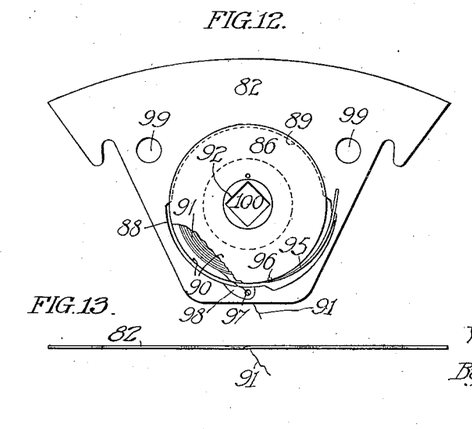
Fig. 12 is a plan view of one of the threaded carriages above contemplated; that is to say, a carriage in which a bobbin is fitted in position to be retained by the tension spring of the carriage and with its thread extending through the guide opening therefor in the carriage; said elements being in the coöperative relation in which they are discharged from said machine. Said elements are in the same relation when they are received by said machine, with the exception that the bobbin is then devoid of thread.
Fig. 13 is a lower edge view of the carriage and bobbin as shown in Fig. 12.

As indicated in Figs. 3, 12 and 13, each of said carriages 82 is a plane sheet metal plate having an approximately circular recess 88 in which a bobbin 86, which is the same thickness as said carriage, is held by the arcual flange 89 of the carriage which extends intermediate of the thickness of the latter between the opposite end flanges 90 of said bobbin which confine the thread 91 thereon; said flanges 90 being rigidly connected with the hub 92 of the bobbin. Said bobbin is held in concentric relation with said carriage flange 89 by the tension spring 95 which is rigidly connected with said carriage at one end and has its free end provided with the projection 96 which fits between said flanges 90 of the bobbin. To release the bobbin from the carriage, it is necessary to thrust said spring 95 radially outward with respect to the bobbin axis until said projection 96 is disengaged from between the bobbin flanges 90, and to move the bobbin in the same direction until it is freed from said arcual carriage flange 89. To replace a bobbin in a carriage, in the operative threaded position shown in Fig. 12, it is necessary to slide the bobbin in the reverse direction, at a slight angle with respect to the plane of the carriage, so that said carriage flange 89 will be engaged between the bobbin flanges 90, and, while the bobbin is thus engaged, to press the spring 95 radially outward with respect to the bobbin and release it so that it will snap inwardly with its projection 96 between the bobbin flanges. Thereupon, the loose end of the thread 91 is drawn down through the guide opening 97 in the carriage; the margin of said opening 97 being recessed, to about one half the thickness of the carriage, as indicated at 98, to permit the free passage of said thread to said opening 97 without scraping the edge of the recess 88. As indicated in Fig. 12 each of said carriages 82 is provided with two openings 99 whereby it may be engaged and held during the operations of discharging and replacing the bobbins, and each of the latter has a central opening 100 by which it may be engaged for such operations; said opening 100 being square to receive a mandrel upon which the bobbins may be wound. The elements of the mechanism for discharging the bobbins are conveniently mounted upon the lift frame 101, (best shown in Fig. 3) which is fitted to slide axially upon said column 28 but prevented from turning thereon by keys 102 projecting from said column in engagement with the hub of said lift frame, as shown in Fig. 7. Said frame is raised and lowered by links 104 which, as shown in Figs. 1 and 3, are pivotally connected with one end of the rock lever 105 which is fulcrumed, intermediate of its length, at 106 in the bracket 107 which is rigidly connected with the upper end of said column 28. The opposite end of said rock lever 105 is pivotally connected, by the link 109, with the upper end of the rectangular bar 110 which is mounted to reciprocate vertically in the bearings 111 on said frame standard 3 and has at the lower end thereof the roller 113 for contact with the cam 114, which is rigidly connected with said crank shaft 19; said roller being maintained in operative relation with said cam by the spring 115 which is seated in the upper end of said column 28 and bears upon the adjacent end of said rock lever 105, as indicated in Fig. 1. Said cam 114 is turned in the direction of the arrow marked thereon in Fig. 2 with the effect of permitting said lift frame 101 to be raised and upheld by said spring 115, in idle position, indicated by the dotted outline of said rock shaft 105 in Fig. 1, during approximately three-fourths of each revolution of said crank shaft 19, and lowering said lift frame into the operative position shown in the drawings, during approximately one-fourth of each revolution of said crank shaft 19 (by the action of said cam against the pressure of said spring;) such movement of said lift frame being, of course, effected in proper sequence with the other operations of the mechanism above described.

Figure 8:
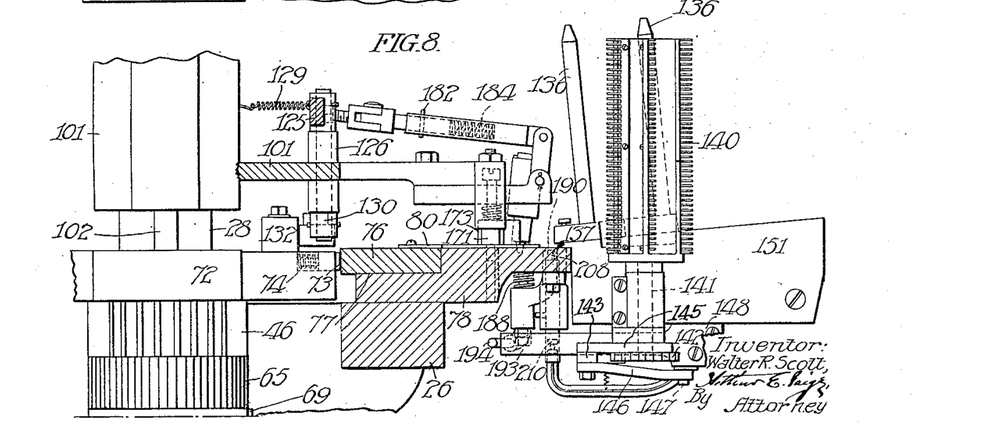
Fig. 8 is a fragmentary radial sectional view of certain parts of said machine shown in Fig. 7, including the mechanism for charging the bobbins into the carriages.
Figures 9, 10, 11:
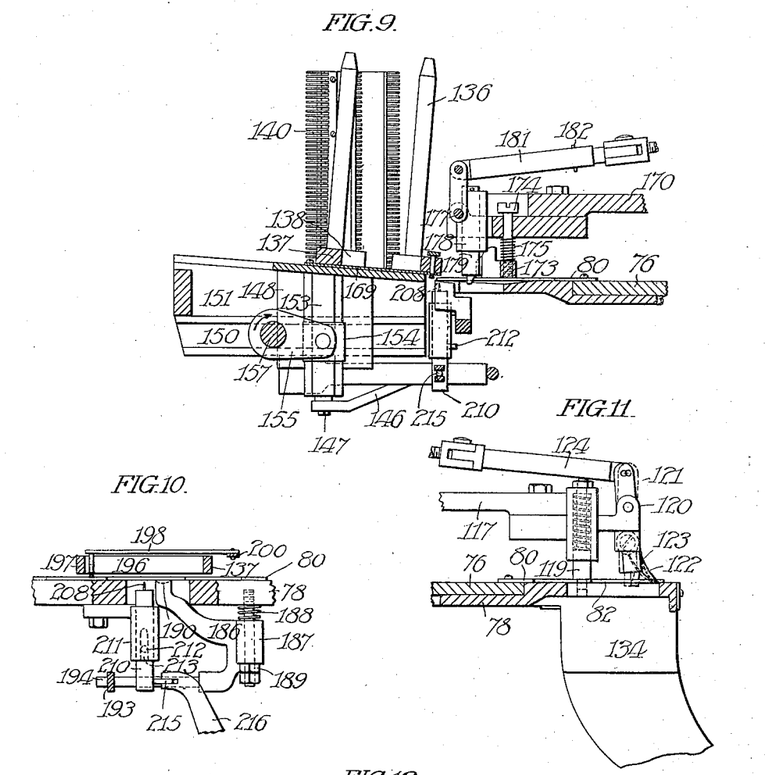
Fig. 9 is a fragmentary sectional view of certain of the parts of said machine shown at the right hand side of Figs. 7 and 8; but taken in the direction opposite to that of Fig. 8.
Fig. 10 is a fragmentary sectional view taken on the line B, B in the direction of the arrows indicated in Fig. 7.
Fig. 11 is a fragmentary radial sectional view, showing one of the diametrically opposite oscillatory fingers for discharging the bobbins from said carriages.

As shown in Fig. 4 said lift frame 101 has four arms. The two arms 117, which are radial with respect to the axis of rotation of said carrier 76 and in registry with diametrically opposite openings 81 in said carrier; are provided with the elements of the mechanism by which the empty bobbins are discharged from the carriages while the latter are held in said openings in the flange 80 of said carrier. Each of said arms 117 has a pair of pendent studs 119 which, when said lift frame is in operative position, extend through the openings 99 of the carriages 82 which are then in registry therewith, as indicated in Fig. 11; whereby said carriages are securely held during the operation of discharging the bobbins therefrom. Each of said arms 117 has fulcrumed at the outer end thereof, on a pin 120, an oscillatory finger lever 121 having at the lower end thereof a finger 122 which, when said lift frame is lowered to the position shown in Fig. 11, extends into the axial opening 100 of the bobbin in the subjacent carriage; said finger 122 being then in the position indicated by the dotted lines in Fig. 11. Said levers 121 also carry wedges 123 which, when said frame is lowered to the position shown in Fig. 11, extend between the outer edges of the bobbins and their respective springs 95 and press said springs outwardly to release them from engagement with the bobbins, to permit the discharge of the latter. Said levers 121 are oscillated by respective links 124 which are pivotally connected with the bell crank levers 125 (shown in Figs. 4 and 7) which are rigidly connected with the vertical shafts 126 journaled in said lift frame 101, as indicated in Fig. 8. Said levers 125 are normally maintained in the position shown in Figs. 4 and 7, against the adjustable stops 128, by the springs 129 connecting said levers with said frame 101; such position corresponding with the position of said finger lever 121 indicated in dotted lines in Fig. 11. However, said shafts 126 each have, rigidly connected with their lower ends, arms 130 provided with rollers 131 adapted to encounter the respective cams 132 carried by said yoke 72; whereby said finger levers 121 are thrust to the position shown in full lines in Fig. 11 and thus discharge the bobbins from the two carriages 82 which are then respectively in registry with said two arms 117. The empty bobbins 86 thus discharged from said carriages 82 gravitate down the respective chutes 134 which are rigidly connected with the stationary frame table 78 as indicated in Figs. 7 and 11 and are thus dropped into the holders 36 then presented in receiving position, at the lower ends of said chutes.

Stacks of bobbins 86, filled with thread 91, are introduced to the machine through holders including the guide studs 136 projecting upwardly from base plates 137 as indicated in Figs. 7, 8 and 9; said base plates having openings 138 through which said bobbins 86 gravitate, and are automatically thrust singly into the machine, as hereinafter described. Of course, each of said bobbins 86 thus introduced to said holder, has a loose end of thread 91 which must be ultimately threaded through the opening 97 in a carrier 82 as shown in Fig. 12, and, in order to control said loose ends I provide rotary combs 140, each including a circumferential series of six blades having teeth which engage the thread ends which are presented thereto by the operator; so that rotation of said combs in the direction indicated by the arrow on Fig. 7 separates said thread ends in proper order and places the threads under tension from the combs to the bobbins. Said combs are merely frictionally fitted upon spindles 141, so that they may be readily turned by hand. However, each of said spindles 141 is provided at its lower end with a ratchet wheel 142, as indicated in Fig. 8, whereby said combs may be automatically turned in definite relation to the operation of the other elements of the mechanism. Such operation is effected by respective pawls 143 pivotally connected with arms 145 which are mounted to turn loosely on said spindles 141 and oscillated by links 146; the latter being pivotally connected with studs 147 on the slides 148 which are fitted to reciprocate, radially to the axis of said carrier 76, in the channels 150 of the brackets 151 which support said holders 137, as shown in Fig. 9, and are rigidly mounted upon said frame table 78. Said slides 148 have vertical ribs 153 in sliding engagement with the heads of the crank blocks 154 which are pivotally connected with the cranks 155 on the cam shafts 157 which are mounted in said brackets and have at the outer ends thereof sprocket wheels 158 which, as shown in Figs. 1, 2 and 3, are operatively connected by the chains 160 with the sprocket wheels 161 on the counter shafts 162 which are journaled at their respectively opposite ends on the standards 2 and 3, as shown in Fig. 1, and have sprocket wheels 164 connected by the chain 165 engaging the sprocket wheel 167 on said crank shaft 19; whereby said cam shafts 157 are simultaneously turned to reciprocate said slides 148 in definite relation to the operation of the other mechanisms above described, and the members 169 on said slides 148 (which are of the same thickness as a single bobbin) respectively engage the bottom bobbins 86 in the stacks in said holders, as said bobbins gravitate singly through the openings 138, and thus thrust them toward the carrier 76 in proper time to introduce said bobbins to the carriages 82 presented by said carrier in registry with the diametrically opposite radial arms 170 of said lift frame 101.

Each of said arms 170 has a pair of pendent studs 171 which, when said lift frame 101 is in operative position, shown in Figs. 8 and 9, extend through the openings 99 of the carriages 82 which are then in registry therewith: whereby said carriages are securely held during the operation of charging them with filled bobbins and threading them. Each of said arms 170 also carries at the outer end thereof, a presser bar 173 which is pendent therefrom upon screw studs 174 having springs 175 pressing said bar downward, so that it resiliently rests upon the subjacent carriage 82 across its recess 88 and serves as a guide for the upper surface of the bobbins 86 which are thrust thereunder into engagement with the arcual ribs 89. Each of said lift arms 170 has fulcrumed at the outer end thereof, on a pin 177, an oscillatory finger lever 178 having at the lower end thereof a finger 179 which, when said lift frame is lowered to the position shown in Fig. 9, extends into the axial opening 100 of the bobbin 86 then presented in proper relation therewith by the inward movement of the slide 148. Said levers 178 are oscillated by respective links 181 which are pivotally connected with said bell crank levers 125, as indicated in Figs. 4 and 7; so that said oscillatory finger levers 178 are oscillated, contemporaneously with said finger levers 121, by the action of said cams 132 above described. However, although the finger levers 121 are positively actuated by their links 124, the finger levers 178 are resiliently actuated by their links 181, the latter being formed of two telescopic sections which are connected by the pins 182 which are normally thrust to the inner ends of the slots 183, as indicated in Fig. 7, under pressure of respective springs 184 in the tubular members of said links 181; the arrangement being such that said rock arms 125 tend to move said fingers 178 to a greater extent than is required to bring the bobbins 86 into engagement with the respective arcual flanges 89 in said holders 82, so as to insure their engagement therewith, whereupon, the springs 184 in said links 181 yield to prevent destructive pressure of said fingers 178 upon said bobbins 86. In order to engage the tension springs 95 of the respective carriages 82 with the threaded bobbins which have thus been fitted therein, I provide means to draw said springs outward and release them so that they will snap into engagement with the flanges 90 of the respective bobbins, with the spring projections 96 between said flanges as indicated in Fig. 12. Such means is illustrated in Figs. 7 to 10 inclusive and comprises levers 186 fulcrumed upon respective studs 187 upon diametrically opposite sides of said table 78, one of them being shown in Fig. 10 and each of them being provided with a spring 188 encircling it and pressing said levers downwardly in opposition to jam nuts 189 by which the vertical position of said levers may be precisely adjusted so that the end 190 of said lever shall sweep the lower surface of each bobbin so as to catch and outwardly deflect the end of the carrier spring 95 which then extends inwardly beneath said bobbin; said lever end 190 serving to not only deflect said spring but precisely present the bobbin in position to receive the spring projection 96. Such spring deflecting movement of said levers 186 is effected by respective springs 192 which respectively connect them with said brackets 151, and reverse movement of said levers 186 is effected by thrust bars 193 on the respective slides 148 which engage the ends 194 of said levers 186 as indicated in Figs. 8 and 10.

As shown in Fig. 10, each of said base plates 137 has a slot 196 which extends transversely to said arms 170 and serves as a guide for the threading hook 197 which is reciprocated therein by the link 198 with which it is rigidly connected; each of said links being pivotally connected with respective levers 200 which are fulcrumed at 201 on said brackets 151, as indicated in Fig. 7. Referring to Figs. 9 and 10; it may be observed that each of said hooks 197 is conveniently formed as a cylindrical member having an annular groove immediately adjoining its lower end so as to have a hooked configuration throughout its circumference and thus insure its hooking engagement with the thread 91 regardless of the particular angle at which it encounters said thread. Said levers 200 have rollers 202 bearing upon cams 203 by which said levers are actuated against the pressure of struts 205 which include two telescopically related members with a spring 206 between them. The threading movement of said hooks 197, toward the right in Fig. 10, carries the bight of the thread 91, (extending under tension from the bobbin 86 to the comb 140) into engagement with the needle 208 (shown in Figs. 9 and 10), as said needle rises through the opening 97 in the carrier 82 then in registry therewith; so that, as said needle, (which has a downwardly hooked upper end, like a fine crotchet needle, as shown in Fig. 9,) descends, it draws said thread through said opening in the carriage, and the immediately succeeding movement of the carrier 76 sweeping said carriage 82 circumferentially upon the table 78 draws said thread from the comb 140, leaving it extending from said carriage, in threaded position, as in Fig. 12. As shown in Figs. 9 and 10; said needle 208 is carried by the bar 210 which is mounted to reciprocate vertically in the bearing 211 which is rigidly connected with said frame table 78; but said bar is prevented from turning, by the pin 212 which slides in the slot 213 in said bearing. Each of said bars 210 has a stud 215 extending in the slotted end of the lever 216 as indicated in Fig. 10. There are two of said levers 216, upon diametrically opposite portions of said machine, as indicated in Fig. 2, respectively fulcrumed on studs 217 on the brackets 151, and each of said levers has a spring 218 connecting it with an adjacent stationary portion of the machine; whereby each needle 208 is raised to engage the thread 91 as above described; the effect of said springs 218 being opposed by respective cams 220 on said cam shafts 157; whereby, said needle bars 210 are held down in the inoperative position shown in Figs. 9 and 10 except during their practically instantaneous threading operation above described.

The operation of said machine is as follows: Beginning with the lift frame 101 in its lowermost position, as shown in Fig. 3 and the other general views, holding two carriages under said lift arms 117, for the discharging operation, and two under the lift arms 170, for the charging operation, and with the other elements of the mechanism in corresponding positions; rotation of the main driving shaft 6 in the direction indicated by the arrow in Fig. 2 contemporaneously causes the bobbin slides 169 to begin their outward movement, (leaving two threaded bobbins 86 engaged by the respective oscillatory fingers 179 on said arms 170) the threading hooks 197 to begin their threading movement, the thread combs 140 to begin to turn in the direction indicated by the arrow in Fig. 7, and the oscillatory fingers 122 and 179 to simultaneously begin their movements of respectively putting the bobbins 86 out of and into the respective carriages 82, thus held. The springs 95 of the two carriages 82 held beneath the lift arms 117 being disengaged from the empty bobbins 86 therein, by the wedges 123 on the finger levers 121, when said lift frame was lowered, slight movement of said levers suffices to discharge those bobbins into the respective chutes 134, from which they gravitate into respective holders 36 on the—then stationary—lower rotary carrier 34. Contemporaneously, the two carriages 82 held beneath the lift arms 170 have said two threaded bobbins 86 pressed into engagement with the respective carriage flanges 89. Thereupon, the two threading needles 208 rise through the openings 97 in said two bobbins 86, under said arms 170; the springs 95 of the two carriages in which those bobbins are fitted are thrust outwardly, by the levers 186, and snapped into engagement between the circumferential flanges 90 of said bobbins, and the ends of the threads 91 of those two bobbins are brought, by said hooks 197, into engagement with said needles 208. As said bobbin slides 169 reach the outer limit of their movement, the combs 140 stop, the needles 208 are lowered, thus threading the two carriages 82 under said lift arms 170, and said lift frame 101 is raised. Thereupon, all the carriages 82 held in said carrier 76 begin to circumferentially shift, by one-eighth revolution of said carrier, in the direction of the arrow indicated in Fig. 4, and the thread hooks 197 return to their normal idle positions indicated in Figs. 4 and 7. While said carriages 82 are being thus shifted, the bobbin slides 169 move inwardly, toward said lift arms 170, each carrying a bobbin 86 from the bottom of the stacks in their respective holders 137, so as to present them as far inward as possible before the carrier 76 stops. Said carrier 76 then stops and said bobbin slides 169 continue inwardly, and the lift frame 101 comes down, to the initial position shown; their respective movements ending simultaneously. When said carrier 76 stops; the two carriages 82 from which the empty bobbins 86 have been discharged, beneath said lift arms 117, are presented beneath said lift arms 170 to be charged with filled bobbins and threaded as above described, but the two carriages 82 which have been thus charged, beneath the lift arms 170, are respectively presented in registry with the two, diametrically opposite, openings 221 in said stationary table 78, (one of which is indicated in dotted lines in Fig. 7) so that they fall from the openings 81, in said carrier 76, through said openings 221, into the chutes 223 from which they fall into respective holders 35 on said lower rotary carrier 34. Said carrier 34 remains stationary during fifty such discharging operations, and then turns one-eighth of a revolution, contemporaneously with the turning movement of said upper carrier 76, but in the opposite direction, to withdraw, from receiving position, the holders 35 and 36 which have been respectively filled with stacks of fifty threaded carriages 82 and empty bobbins 86, and present other such holders in receiving position. Said stacks are manually removed, at the convenience of the operator.

I do not desire to limit myself to the precise details of construction and arrangement above described, as it is obvious that various modifications may be made therein without departing from the essential features of my invention, as defined in the appended claims.

I claim:—

1. In lace machine carriage threading mechanism, the combination with a stationary frame including a table with discharge openings; of a driving shaft journaled in said frame; two rotary carriers, one above the other, operatively connected with said shaft for step by step rotation; the lower carrier being turned only after a series of turning movements of the upper carrier; the upper carrier having means arranged to hold unthreaded carriages singly, for operation thereon, in circular spaced relation to the axis of said upper carrier; the lower carrier having means arranged to hold threaded carriages in stacks, for delivery; said upper carrier being arranged to successively drop empty bobbins and threaded carriages through said discharge openings into the holding means on said lower carrier; a lift frame operatively connected with said shaft, arranged to reciprocate to and from operative relation with said upper carrier; mechanism on said lift frame arranged to discharge empty bobbins from said carriages in said upper carrier; mechanism on said lift frame, arranged to charge the emptied carriages, in said upper carrier, with threaded bobbins; and mechanism arranged to insert the free ends of the bobbin threads in threaded relation with said carriages.

2. In lace machine carriage threading mechanism, the combination with a stationary frame; of a driving shaft journaled in said frame; two rotary carriers, one above the other, operatively connected to be turned by said shaft; the upper carrier having means arranged to hold unthreaded carriages singly, in spaced relation; the lower carrier having means arranged to hold threaded carriages in stacks; said upper carrier being arranged to drop empty bobbins and threaded carriages into the holding means on said lower carrier; a lift frame operatively connected with said shaft, arranged to reciprocate to and from operative relation with said upper carrier; mechanism on said lift frame arranged to discharge empty bobbins from said carriages in said upper carrier; mechanism on said lift frame arranged to charge the emptied carriages, in said upper carrier, with threaded bobbins; and mechanism arranged to insert the free ends of the bobbin threads in threaded relation with said carriages.

3. In lace machine carriage threading mechanism, the combination with a stationary frame; of a driving shaft journaled in said frame; two rotary carriers, operatively connected with said shaft for step by step rotation; one carrier having means arranged to hold unthreaded carriages singly, in spaced relation; the other carrier having means arranged to hold threaded carriages in stacks, for delivery; the first carrier being arranged to successively discharge empty bobbins and threaded carriages into the holding means on said other carrier; a frame operatively connected with said shaft, arranged to move to and from operative relation with said first carrier; mechanism on said frame arranged to discharge empty bobbins from said carriages in said first carrier; mechanism on said frame, arranged to charge the emptied carriages, in said first carrier, with threaded bobbins; and mechanism arranged to insert the free ends of the bobbin threads in threaded relation with said carriages.

4. In lace machine carriage threading mechanism, the combination with a stationary frame; of a driving shaft journaled in said frame; a rotary carrier, operatively connected with said shaft for step by step rotation, and having means arranged to hold unthreaded carriages singly, in circular spaced relation to the axis of said carrier; said carrier being arranged to successively discharge empty bobbins and threaded carriages; a lift frame operatively connected with said shaft, arranged to reciprocate to and from operative relation with said carrier; mechanism on said lift frame arranged to discharge empty bobbins from carriages in said carrier; mechanism on said lift frame arranged to charge the emptied carriages, in said carrier, with threaded bobbins; and mechanism arranged to insert the free ends of the bobbin threads in threaded relation with said carriages.

5. In lace machine carriage threading mechanism, the combination with mechanism arranged to discharge empty bobbins from such carriages; of mechanism arranged to charge the emptied carriages with filled bobbins; actuated means coöperatively connecting said two mechanisms for contemporaneous operation, including a lever, common to both said bobbin discharging and bobbin charging mechanism, links respectively extending from said lever to said mechanisms, one of said links comprising relatively movable sections and a spring tending to elongate said link, whereby that link is automatically variable in its effective length between said lever and said charging mechanism; and means arranged to rock said lever to an extent greater than required for movement of said charging mechanism; whereby said bobbins are resiliently thrust into engagement with said carriages, against the pressure of said spring.

6. In lace machine carriage threading mechanism, the combination with a reciprocatory hook needle; of means arranged to hold such a carriage with a thread guide opening in registry with said needle; a threading device including a hook, extending parallel with said needle, transversely movable to engage a thread with said needle; an oscillatory link rigidly connected with said threading hook; a plate extending transversely to said threading hook, and having a guide slot engaging said hook, and affording a fulcrum for said link; and actuating means arranged to coöperatively thrust said needle through said opening, move said threading device to thread the needle, and retract said needle; whereby said carriage is threaded; and means arranged to automatically remove said carriage from threading position.

7. In lace machine carriage threading mechanism, the combination with a reciprocatory hook needle; of means arranged to hold such a carriage with a thread guide opening in registry with said needle; a threading device including a hook movable to engage a thread with said needle; guiding means limiting the movement of said hook to a substantially straight line; hook actuating means, including an oscillatory link fulcrumed on said guiding means and having said threading hook at its center of oscillation; and actuating means arranged to coöperatively thrust said needle through said opening, move said threading device to thread the needle, and retract said needle; whereby said carriage is threaded.

8. In lace machine carriage threading mechanism, the combination with a frame; of two rotary carriers, mounted to rotate on said frame and each having carriage holding means; the holding means in one carrier being adapted to coöperate with the holding means in the other carrier in one position of relative rotation of said carriers; and means arranged to relatively move said carriers and successively present each of the holding means in one carrier in coöperative relation with the holding means in the other carrier, including a ratchet wheel in concentric relation with one of said carriers, a reciprocatory pawl arranged to turn said ratchet wheel step by step, a cam projection carried by said ratchet wheel, and coupling means arranged to be operated by said cam after predetermined numbers of said pawl movements; whereby one of said carriers is turned only after a series of turning movements of the other carrier.

9. In lace machine carriage threading mechanism, the combination with a carriage, having a spring adapted to engage a bobbin in said carriage; of means arranged to charge said carriage with a bobbin, including a lever arranged to directly engage and move said spring into engagement with said bobbin, and means arranged to hold said carriage stationary during such movement.

10. In lace machine carriage threading mechanism, the combination with a carriage having a spring adapted to engage a bobbin in said carriage; of means arranged to charge said carriage with a bobbin, including a lever, fulcrumed on an axis extending parallel with the axis of said bobbin and arranged to directly engage and move said spring into engagement with said bobbin.

11. In lace machine carriage threading mechanism, the combination with a holder for a threaded bobbin, adapted for coöperation with one of said carriages; of means arranged to engage and hold the free end of the thread from said bobbin, under tension, including a rotary comb and means arranged to turn said comb in engagement with said thread end; a guide plate limiting the passage of said bobbin to threading position and limiting the position of the thread extending from said bobbin; and a thread hook, extending parallel with the axis of said comb and having means to move it transversely to engage said thread between said bobbin and said comb.

12. In lace machine carriage threading mechanism, the combination with a stack holder for bobbins for said carriages; of a reciprocatory slide arranged to feed bobbins singly from said stack; means arranged to hold in order the free ends of threads respectively extending from said bobbins, including a rotary comb, and means operated by said slide, arranged to turn said comb in engagement with said thread ends.

13. In lace machine carriage threading mechanism, the combination with a holder for a threaded bobbin, adapted for coöperation with one of said carriages; of means arranged to engage and hold the free end of the thread from said bobbin, under tension, including a rotary comb and coöperatively connected reciprocatory means arranged to turn said comb in engagement with said thread end, and shift said bobbin to said carriage; and guiding means limiting the passage of said bobbin to threading position and limiting the position of the thread extending from said bobbin.

14. In lace machine carriage threading mechanism, the combination with a frame; of a vertical shaft supported by said frame; means rigidly connecting said shaft with said frame; a rotary carrier mounted to rotate coaxially about said shaft; a second rotary carrier, larger than said first carrier, arranged to rotate eccentrically about said shaft; means on said first carrier arranged to hold carriages singly, in a circular series; means on said second carrier, including a circular series of stack holders, each arranged to hold a stack of carriages; means on said second carrier, including a second series of stack holders, each arranged to hold a stack of bobbins; the carriage holding means in said first carrier being adapted to coöperate with the carriage holding means in said second carrier in one position of relative rotation of said carriers; coöperative means arranged to relatively turn said carriers, step by step, whereby, each of the carriage holding means in the first carrier is adapted to successively coöperate with each of the carriage holding means in the second carrier; and means arranged to direct carriages from the holding means in said first carrier to the holding means in said second carrier, when in coöperative relation therewith.

15. In lace machine carriage threading mechanism, the combination with a frame; of a vertical shaft supported by said frame; means rigidly connecting said shaft with said frame; a rotary carrier mounted to rotate coaxially about said shaft; a second rotary carrier, larger than said first carrier, arranged to rotate eccentrically about said shaft; means on said first carrier arranged to hold carriages singly, in a circular series; means on said second carrier, including a circular series of stack holders, each arranged to hold a stack of carriages; the carriage holding means in said first carrier being adapted to coöperate with the carriage holding means in said second carrier in one position of relative rotation of said carriers; coöperative means arranged to relatively turn said carriers, step by step, whereby, each of the carriage holding means in the first carrier is adapted to successively coöperate with each of the carriage holding means in the second carrier; and means arranged to direct carriages from the holding means in said first carrier to the holding means in said second carrier, when in coöperative relation therewith.

16. In lace machine carriage threading mechanism, the combination with a frame; of a vertical shaft supported by said frame; means rigidly connecting said shaft with said frame; a rotary carrier mounted to rotate coaxially about said shaft; a second rotary carrier, arranged to rotate eccentrically about said shaft; means on said first carrier arranged to hold carriages singly, in a circular series; means on said second carrier, including a circular series of stack holders, each arranged to hold a stack of carriages; the carriage holding means in said first carrier being adapted to coöperate with the carriage holding means in said second carrier in one position of relative rotation of said carriers; coöperative means arranged to relatively turn said carriers, step by step, whereby, each of the carriage holding means in the first carrier is adapted to successively coöperate with each of the carriage holding means in the second carrier; and means arranged to direct carriages from the holding means in said first carrier to the holding means in said second carrier, when in coöperative relation therewith.

17. In lace machine carriage threading mechanism, the combination with a frame; of a shaft supported by said frame; a rotary carrier mounted to rotate coaxially about said shaft; a second rotary carrier, arranged to rotate eccentrically about said shaft; means on said first carrier arranged to hold carriages singly, in a circular series; of means on said second carrier, including a circular series of stack holders, each arranged to hold a stack of carriages; means on said second carrier, including a second series of stack holders, each arranged to hold a stack of bobbins; the carriage holding means in said first carrier being adapted to coöperate with the carriage holding means in said second carrier in one position of relative rotation of said carriers; coöperative means arranged to relatively turn said carriers, step by step, whereby, each of the carrier holding means in the first carrier is adapted to successively coöperate with each of the carriage holding means in the second carrier; and means arranged to direct carriages from the holding means in said first carrier to the holding means in said second carrier, when in coöperative relation therewith.

18. In lace machine carriage threading mechanism, the combination with a frame; of a shaft supported by said frame; a rotary carrier mounted to rotate coaxially about said shaft; a second rotary carrier, arranged to rotate eccentrically about said shaft; means on said first carrier arranged to hold carriages singly, in a circular series; means on said second carrier, including a circular series of stack holders, each arranged to hold a stack of carriages; the carriage holding means in said first carrier being adapted to coöperate with the carriage holding means in said second carrier in one position of relative rotation of said carriers; coöperative means arranged to relatively turn said carriers, whereby, each of the carriage holding means in the first carrier is adapted to successively coöperate with each of the carriage holding means in the second carrier; and means arranged to direct carriages from the holding means in said first carrier to the holding means in said second carrier, when in coöperative relation therewith.

19. In lace machine carriage threading mechanism, the combination with a frame; of a vertical shaft supported by said frame; means rigidly connecting said shaft with said frame; a rotary carrier mounted to rotate coaxially about said shaft; a second rotary carrier, arranged to rotate eccentrically about said shaft; means on said first carrier arranged to hold carriages singly, in a circular series; means on said second carrier, including a series of stack holders, each arranged to hold a stack of bobbins; the carriage holding means in said first carrier being adapted to coöperate with the bobbin holding means in said second carrier in one position of relative rotation of said carriers; coöperative means arranged to relatively turn said carriers, step by step, whereby, each of the carriage holding means in the first carrier is adapted to successively coöperate with each of the bobbin holding means in the second carrier; and means arranged to direct bobbins from the holding means in said first carrier to the holding means in said second carrier, when in coöperative relation therewith.

20. In lace machine carriage threading mechanism, the combination with a frame; of a shaft supported by said frame; a rotary carrier mounted to rotate coaxially about said shaft; a second rotary carrier, arranged to rotate eccentrically about said shaft; means on said first carrier arranged to hold carriages singly, in a circular series; means on said second carrier, including a series of stack holders, each arranged to hold a stack of bobbins; the carriage holding means in said first carrier being adapted to coöperate with the bobbin holding means in said second carrier in one position of relative rotation of said carriers; coöperative means arranged to relatively turn said carriers, whereby, each of the carriage holding means in the first carrier is adapted to successively coöperate with each of the bobbin holding means in the second carrier; and means arranged to direct bobbins from the holding means in said first carrier to the holding means in said second carrier, when in coöperative relation therewith.

21. In lace machine carriage threading mechanism, the combination with a frame; of a vertical shaft supported by said frame; means rigidly connecting said shaft with said frame; a rotary carrier mounted to rotate coaxially about said shaft; a second rotary carrier, arranged to rotate eccentrically about said shaft; means on said first carrier arranged to hold carriages containing bobbins singly; means on said second carrier, arranged to hold carriages and bobbins separately; the carriage holding means in said first carrier being adapted to coöperate with both the carriage and bobbin holding means in said second carrier in one position of relative rotation of said carriers; coöperative means arranged to relatively turn said carriers, step by step, whereby, the carriage holding means in the first carrier is adapted to coöperate with the carriage and bobbin holding means in the second carrier; and means arranged to direct both carriages and bobbins from the holding means in said first carrier to the holding means in said second carrier, when in coöperative relation therewith.

22. In lace machine carriage threading mechanism, the combination with a frame; of a shaft supported by said frame; a rotary carrier mounted to rotate coaxially about said shaft; a second rotary carrier, arranged to rotate eccentrically about said shaft; means on said first carrier arranged to hold carriages containing bobbins, singly; means on said second carrier, arranged to hold carriages and bobbins separately; the carriage holding means in said first carrier being adapted to coöperate with both the carriage and bobbin holding means in said second carrier in one position of relative rotation of said carriers; coöperative means arranged to relatively turn said carriers, step by step, whereby, the carriage holding means in the first carrier is adapted to coöperate with the carriage and bobbin holding means in the second carrier; and means arranged to direct both carriages and bobbins from the holding means in said first carrier to the holding means in said second carrier, when in coöperative relation therewith.

In testimony whereof I have hereunto signed my name at Philadelphia, Pennsylvania, this 19th day of April, 1916.

WALTER R. SCOTT.

Witnesses:
THOMAS A. COUPE,
ROBERT L. McDEVITT.